United States Patent [19]

Spanke

[11] 4,077,523

[45] Mar. 7, 1978

[54] VERTICALLY SWINGING ARTICLE TRANSFER APPARATUS

[75] Inventor: Edwin A. Spanke, Oak Forest, Ill.

[73] Assignee: Gulf & Western Manufacturing Company, Southfield, Mich.

[21] Appl. No.: 662,728

[22] Filed: Mar. 1, 1976

[51] Int. Cl.$^2$ .............................................. B65G 47/90

[52] U.S. Cl. ............................. 214/1 BD; 214/147 T; 214/148

[58] Field of Search .............. 214/1 BB, 1 BT, 147 T, 214/146.5, 148, 149, 1 Q, 1 QA, 1 R, 1 BV, 1 BD; 74/512, 513

[56] References Cited

U.S. PATENT DOCUMENTS

| | | | |
|---|---|---|---|
| 1,766,573 | 6/1930 | Westin | 214/1 BD |
| 3,232,446 | 2/1966 | Spurr et al. | 214/1 BD |
| 3,270,379 | 9/1966 | Sehn et al. | 214/1 BD X |
| 3,902,606 | 9/1975 | Ronbeck | 214/1 BV |
| 3,921,822 | 11/1975 | Dixon | 214/1 Q X |

*Primary Examiner*—Frank E. Werner
*Attorney, Agent, or Firm*—Meyer, Tilberry & Body

[57] ABSTRACT

A mechanism is disclosed for transferring a metal billet to and from a metalworking press. The mechanism includes an upright support member and a transfer arm having one end slidably and pivotally associated therewith. The other end of the arm carries a workpiece holder which is adapted to selectively grip and release a workpiece to be transferred. A link member has opposite ends pivotally connected one with the arm and the other with the support member and is actuable to pivotally and slidably displace the arm from one side of the support member to the other. The support member is located between the press and a billet conveyor mechanism, whereby displacement of the arm serves to transfer a billet between the conveyor and press locations. The workpiece holder has an axis of orientation which is rotated 90° in response to movement of the arm between the conveyor and press locations, thus to rotate the billet axis 90° during a transfer operation.

15 Claims, 8 Drawing Figures

VERTICALLY SWINGING ARTICLE TRANSFER APPARATUS

This invention relates to the art of article handling devices and, more particularly, to a mechanism for transferring an article from one location to another.

The present invention finds particular utility in conjunction with transferring a metal billet to and from the bed of a forging press and, accordingly, will be discussed in detail in connection with such use. It will be appreciated, however, that the mechanism can readily be employed to transfer articles other than metal billets and to transfer articles other than to and from a metalworking press.

In conjunction with the operation of a metalworking press, such as a forging press, metal billets to be forged are generally conveyed to the press, transferred from the conveyor to the press, forged and then transferred from the press to a receiving conveyor by which the forged billets are carried away from the press. Many arrangements and mechanisms have been provided heretofore for transferring a billet from an input conveyor to a press and for transferring a forged billet from the press to an output conveyor. Such previous mechanisms have been structurally and operationally complex and thus expensive to manufacture, operate and maintain. Additionally, certain of the transfer mechanisms heretofore provided require considerable floor space adjacent the press and obstruct areas or portions of the press to which access may be required by the press operator. Moreover, previous transfer mechanisms for loading and unloading a press sometimes are structurally different from one another. This not only requires two different mechanisms for a given press but also complicates maintenance procedures and the expense of maintenance by negating interchangeability of the mechanisms or parts thereof.

It is often desirable in connection with the transfer of a billet to and from a press to reorient the axis of the billet during the transfer procedure. In this respect, for example, it may be desired to convey a cylindrical billet with the axis of the billet in a horizontal disposition, and to transfer the billet so that the axis thereof is vertical when the billet is positioned in the press. Transfer mechanisms heretofore devised for achieving such reorientation during the transfer process have added to the structural complexity of the mechanisms as well as the production and maintenance costs thereof. Still further, the structural and operational complexity of such transfer mechanisms can limit the speed of a transfer operation and can, as a result, necessitate reducing the operational speed of the press to a level below the rated level thereof. Accordingly, the production rate of the press is reduced with respect to that which might otherwise be obtained therewith.

An improved article transfer mechanism is provided in accordance with the present invention which advantageously overcomes or minimizes the foregoing and other disadvantages encountered in connection with previous transfer mechanisms. In this respect, the improved transfer mechanism is comprised of a minimum number of parts interrelated to provide structural simplicity and simplicity of operation. Additionally, a pair of structurally identical mechanisms are operable in conjunction with one another to achieve press loading and unloading operations. These attributes lend to minimizing the costs of production and operation as well as maintenance costs, while enabling higher speed transfer operations, efficient mechanical operation and minimum floor space requirements.

The transfer mechanism in accordance with the present invention is comprised basically of three structural members which, in the receiving and discharge positions of the mechanism define a triangle. One leg of the triangle is a fixed support member, a second leg of the triangle is a transfer arm having one end pivotally and slidably associated with the support member, and the third leg of the triangle is a link member having one end pivotally connected to the transfer arm and the other end pivotally connected to the support member. A workpiece holder is attached to the transfer arm for displacement therewith and is operable to grip and release a workpiece. This structural arrangement enables the pivot axis between the transfer arm and link member to be displaced between opposite sides of the fixed support member, thus to transfer an article gripped by the workpiece holder from one side of the fixed support member to the other. In connection with loading a press, for example, the support member is positioned between the press and a workpiece supply station. Thus, transfer arm displacement in the foregoing manner is operable to transfer a workpiece from the workpiece station to the press.

Preferably, the workpiece holder is interconnected with the transfer arm against rotational displacement relative thereto, and the transfer operation between the locations on opposite sides of the support member operates to turn the workpiece holder such that a workpiece held thereby is reoriented 90° during the transfer procedure. The three members defining the legs of the triangle enable the transfer mechanism to have a minimum lateral width with respect to the direction of workpiece transfer, thus to minimize required floor space and increase accessibility to the press. Additionally, the support member is preferably pivotal about a vertical axis to enable pivotal movement of the transfer mechanism to a non-use position with respect to the press, thus to further increase accessibility to the press for maintenance purposes or the like.

It is accordingly an outstanding object of the present invention to provide an improved mechanism for transferring an article between spaced apart locations.

Still another object is the provision of a transfer mechanism of the foregoing character in which article transfer is achieved through a mechanical movement requiring a minimum number of movable parts, whereby production of the mechanism is economical, operation of the mechanism is reliable and efficient, and maintenance costs are minimized.

Yet another object is the provision of a transfer mechanism of the foregoing character in which the component parts are cooperable during an article transfer operation to rotate an axis of orientation of the article.

Still a further object is the provision of a transfer mechanism of the foregoing character which is particularly suitable for use with a metalworking press to transfer a metal billet to and/or from the press.

Yet another object is the provision of a transfer mechanism of the foregoing character in which the component parts are structurally interrelated with one another and with the press to enable ready access to the press for maintenance purposes or the like.

The foregoing objects, and others, will in part be obvious and in part pointed out more fully hereinafter in conjunction with the following written description of preferred embodiments illustrated in the accompanying drawings in which.

Figure 1:
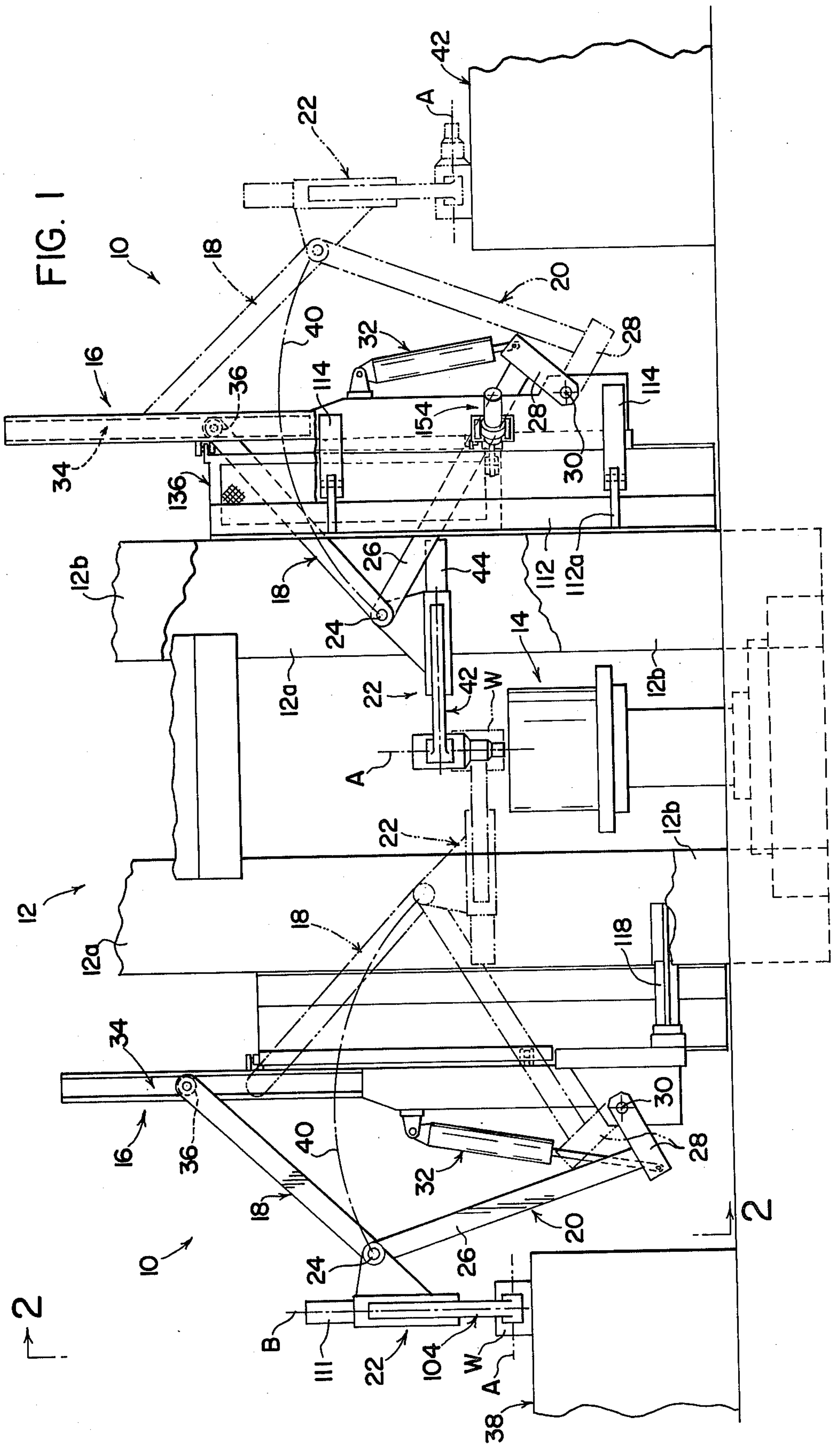
FIG. 1 is a front elevation view of a metal forging press having transfer mechanisms in accordance with the present invention on opposite sides of the press to achieve billet loading and unloading operations with respect to the press.

Referring now in greater detail to the drawings wherein the showings are for the purpose of illustrating preferred embodiments of the invention only and not for the purpose of limiting the invention, billet transfer mechanisms 10 are shown in FIG. 1 as being located adjacent opposite sides of a metal forging press 12. The structure and operation of press 12 are not pertinent to the present invention and, accordingly, will not be fully described in detail. For purposes of understanding the present invention it will be sufficient to note that the press includes a pair of rear frame posts **12*a* and a pair of front frame posts 12*b*. Additionally, it will be appreciated that the press includes a lower die mechanism 14 with respect to which a billet to be formed is positioned, and an upper die mechanism, not illustrated, which is cooperable with the lower die to form a workpiece therebetween during an operating stroke of the press. Transfer mechanisms 10 are the same in structure and, accordingly, only one of the mechanisms will be described in detail. Moreover, like numerals appear in FIG. 1 to designate like components of the mechanisms on the opposite sides of the press. As will become more apparent hereinafter, the mechanisms on opposite sides of the press are merely turned around with respect to one another. The mechanism on the left side of press 12 and described hereinafter is supported by the corresponding rear press frame post 12*a*. Accordingly, the mechanism on the right side of the press is supported by the corresponding front press frame post 12*b***.

Each transfer mechanism 10 basically includes an upright support member 16, a transfer arm 18, a link member 20 and a workpiece holder 22. Transfer arm 18 and link 20 are pivotally interconnected such as by a pin 24 which is keyed or otherwise secured to arm 18 to prevent relative rotation therebetween. As described in greater detail hereinafter, workpiece holder 22 is also keyed to pin 24 against rotation relative thereto, whereby the holder is movable with arm 18 and is fixed against rotation relative thereto. In the embodiment shown, link 20 is generally L-shaped and includes a first leg 26 and a second leg 28 secured to the lower end of leg 26. Leg 28 is interconnected with support member 16 for pivotal movement relative thereto about a horizontal axis 30, and a suitable drive arrangement is provided for pivoting link 20. Preferably, a hydraulically actuable piston and cylinder assembly 32 is interconnected with leg 28 and support member 16 to impart pivotal movement to link 20. It will be appreciated, of course, that piston and cylinder assembly 32 is connected to a suitable source of hydraulic fluid through appropriate controls, not illustrated, to achieve the necessary actuation thereof to pivot link 20. The upper end of support member 16 is provided with a vertically extending guide track in the form of a recess 34, and the corresponding end of transfer arm 18 is provided with a follower 36 received in recess 34 for sliding movement therealong.

In the solid line position of the components in the transfer mechanism shown on the left of the press in FIG. 1, workpiece holder 22 is positioned to receive a workpiece W from a conveyor mechanism or the like 38 which defines a first workpiece location. The transfer mechanism is adapted to be actuated, as described hereinafter, to transfer workpiece W into an appropriate position with respect to die assembly 14 of the press which accordingly defines a second location for the workpiece. In the embodiment shown, workpiece W is a cylindrical metal billet having an axis A, and workpiece holder 22 has an axis of orientation B.

The mechanism movements and operations of the transfer mechanisms on opposite sides of the press are the same and will be understood from the following description of operation of the mechanism shown on the left hand side of the press in FIG. 1. Assuming the latter mechanism to be in the solid line position shown in FIG. 1, workpiece holder 22 is actuable, as set forth in detail hereinafter, to grip workpiece W. Hydraulic piston and cylinder assembly 32 is then actuated to pivot link 20 clockwise about axis 30. This pivotal movement constrains pin 24 and thus the corresponding end of transfer arm 18 to move along an arcuate path 40. The latter movement of pin 24 along arcuate path 46 is made possible by the sliding engagement between follower 36 and guide track 34. Thus, during pivotal movement of link 20 from the solid line position thereof to the broken line position shown in FIG. 1 with respect to the left hand transfer mechanism, workpiece holder 22 is displaced from its position overlying conveyor 38 to its position overlying die assembly 14. Moreover, during this pivotal movement the fixed relationship between workpiece holder 22 and arm 18 through pin 24 causes axis B of the workpiece holder and thus axis A of workpiece W to be reoriented 90° from the positions thereof at the first workpiece location. Accordingly, when workpiece holder 22 is positioned over die assembly 14 axis A of the workpiece is vertical. At this time, workpiece holder 22 is actuated to release workpiece W, and piston and cylinder assembly 32 is then actuated to pivot link 20 counterclockwise about axis 30 to return the components of the transfer mechanism to the solid line positions shown in FIG. 1.

Following operation of the press on workpiece W, during which, for example, the workpiece is shaped to the configuration W', mechanism 10 shown on the right hand side of the press in FIG. 1 is actuated through the corresponding piston and cylinder assembly 32 to displace the arm, link and workpiece holder components from the broken line positions to the solid line positions. In the latter positions workpiece holder 22 is positioned to grip the shaped workpiece W'. Thereafter, the arm, link and workpiece holder components are displaced back to the broken line positions in which workpiece holder 22 overlies a discharge conveyor 42, and workpiece holder 22 is actuated to release the shaped workpiece. It will be appreciated, of course, that the loading and unloading transfer mechanisms are operated in coordination with one another and with the operation of the press to achieve the billet loading and unloading operations.

The foregoing structure and operation of a transfer mechanism 10 will be better understood in connection with the ensuing description of FIGS. 2–8 showing preferred structures of the component parts and preferred structural interrelationships therebetween. It will be appreciated that the following description is applicable to both transfer mechanisms 10 shown in FIG. 1. Moreover, like numerals are employed in FIG. 1 and FIGS. 2–8 to designate like components.

Figure 3:
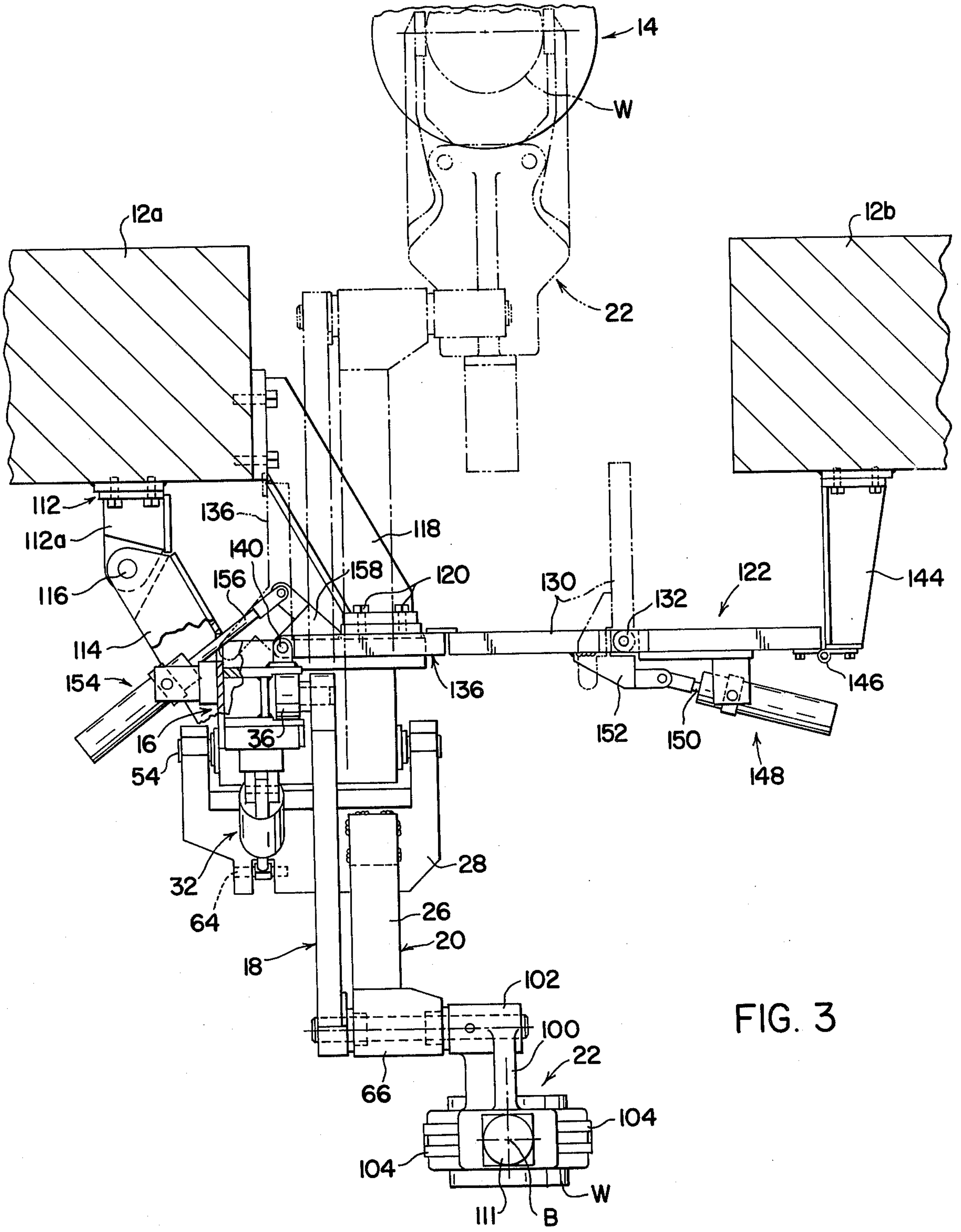
FIG. 3 is a plan view of the mechanism shown in FIG. 2 as viewed along line 3—3 in FIG. 2.
Figure 4:
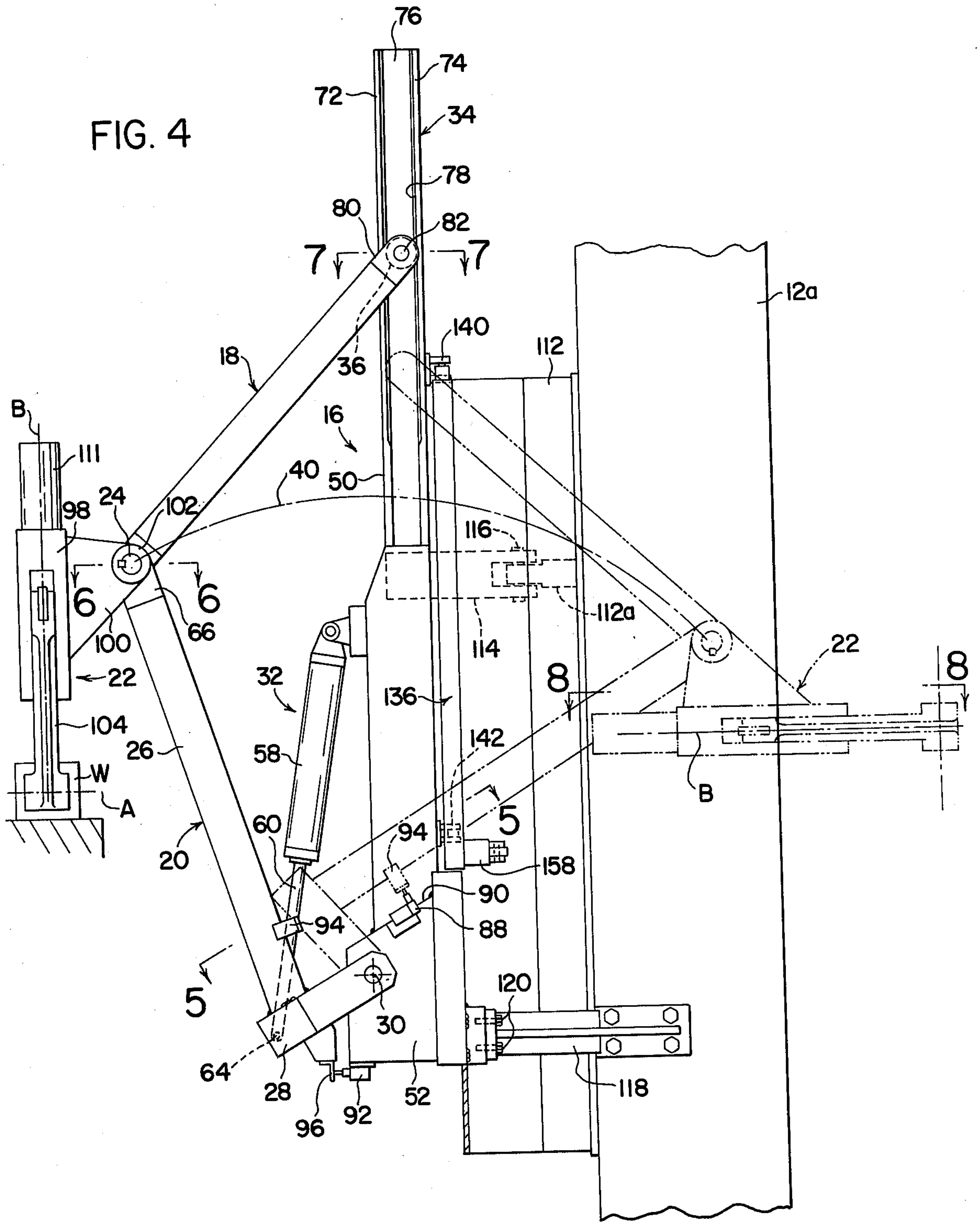
FIG. 4 is a sectional elevation view of the mechanism taken along line 4—4 in FIG. 2.
Figure 5:
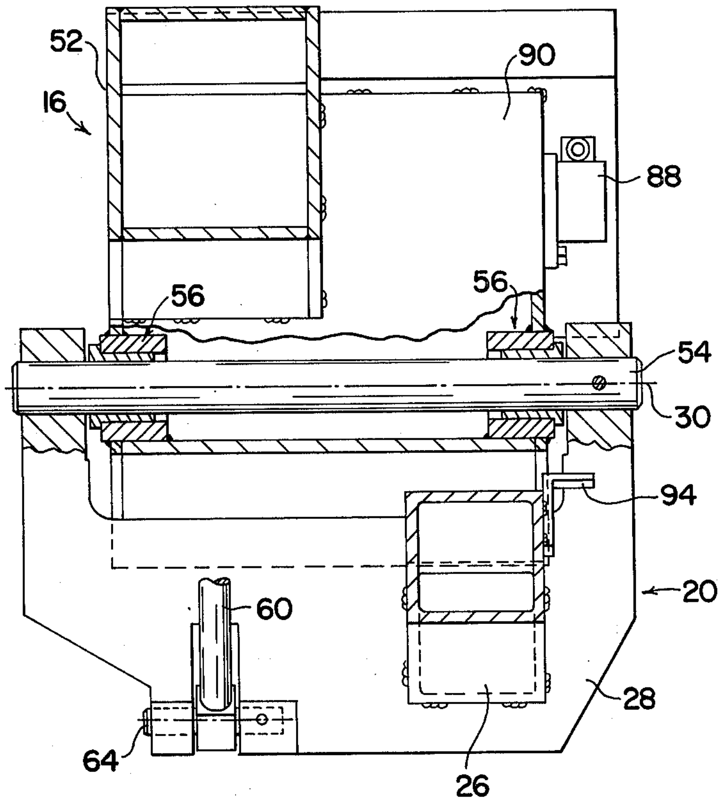
FIG. 5 is a sectional view of a portion of the mechanism taken along line 5—5 in FIG. 4.

Referring now in particular to FIGS. 2–5, upright support member 16 is a fabricated beam including an upper portion 50 and a lower portion 52. Link 20 is pivotally mounted on lower portion 52, as best seen in FIG. 5. In this respect, leg 26 of link 20 is a hollow beam, and leg 28 of the link is a U-shaped member to which the corresponding end of leg 26 is welded or otherwise secured. The sides of leg 28 overlie corresponding sides of lower portion 52 of support member 16, and leg 28 and lower portion 52 are pivotally interconnected by means of a pin 54 extending therethrough. Pin 54 is suitably supported for pivotal movement relative to lower portion 52 of support member 16 by bearing sleeve assemblies 56 mounted on lower portion 52. Piston and cylinder assembly 32 includes a cylinder 58 and a piston rod 60 which is extendable and retractable relative to the cylinder in a well known manner. The upper end of cylinder 58 is pivotally connected to support member 16 intermediate the upper and lower ends thereof by means of a suitable bracket and pin arrangement 62, and the lower end of piston rod 60 is pivotally connected to leg 28 of link 20 by means of a pin 64.

Referring now in particular to FIG. 6 and FIGS. 2–4, the upper end of leg 26 of link 20 is provided with a metal block 66 which is welded or otherwise secured thereto. Block 66 is apertured to rotatably receive pivot pin 24, and suitable bearing sleeves 67 support pin 24 for such rotation. Link 20 is disposed laterally between transfer arm 18 and workpiece holder 22 and, in the embodiment shown, transfer arm 18 is keyed to pin 24 by means of a key 68. Further, workpiece holder 22 is keyed to the pin by means of a key 70. Accordingly, workpiece holder 22 and arm 18 are interconnected against relative rotation therebetween, as mentioned hereinabove, and link 20 is pivotal relative thereto and about the axis of pin 24.

Figure 2:
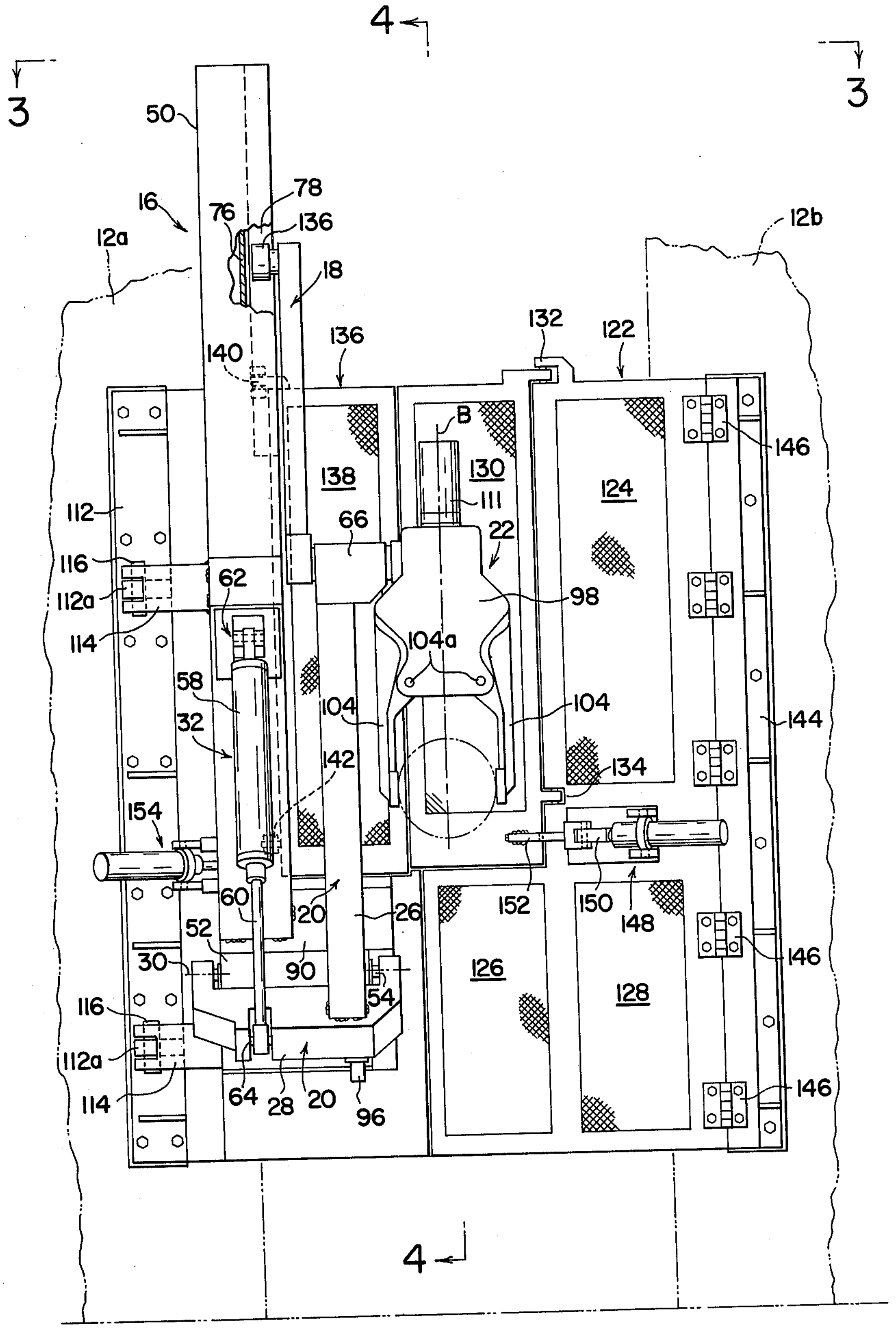
FIG. 2 is an elevation view in detail of the transfer mechanism on the left hand side of the press in FIG. 1 and as the mechanism is viewed from the left hand side of the press.
Figure 7:
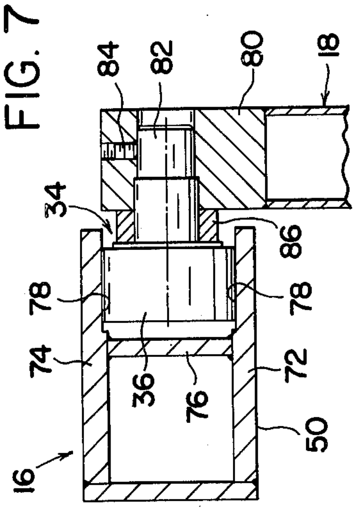
FIG. 7 is a sectional view of a portion of the mechanism taken along line 7—7 in FIG. 4; and, FIG. 8 is a plan view of the workpiece holder as seen along line 8—8 in FIG. 4.

Referring now to FIG. 7 together with FIGS. 2–4, upper portion 50 of support member 16 includes a pair of parallel spaced apart plates 72 and 74 and a cross plate 76 extending therebetween. Portions of plates 72 and 74 and cross plate 76 provide a channel or recess defining track 34 for follower 36. Preferably, the inner surfaces of plates 72 and 74 are machined to provide opposed track surfaces 78 slidably engaged by follower 36. Transfer arm 18 is a tubular metal beam and is provided at its upper end with a metal block 80 which is welded or otherwise secured thereto to provide a support for follower 36. In the embodiment shown, follower 36 is circular and includes a mounting pin portion 82 received in a corresponding opening therefor in block 80. A set screw or the like 84 releaseably secures follower 36 to block 80 and, preferably, a spacer collar 86 is employed to provide a desired spacing of follower 36 from the corresponding side of transfer arm 18.

It will be appreciated from the foregoing description, assuming the component parts to be in the solid line positions shown in FIG. 4 of the drawing, that piston and cylinder assembly 32 is adapted to be actuated to retract piston rod 60 relative to cylinder 58 thus to pivot link 20 clockwise about axis 30. This pivotal action of link 20 constrains follower 36 on transfer arm 18 to move upwardly along track 34 and for the lower end of arm 18 and, more particularly, the axis of pin 24 to move along arcuate path 40. The latter path is of course fixed with respect to axis 30 and has a radius of curvature determined by the distance between axis 30 and the axis of pin 24. Eventually, such pivotal movement of link 20 repositions the component parts in the broken line positions shown in FIG. 4 and in which axis B of workpiece holder 22 is reoriented 90° from the position thereof shown by solid lines in FIG. 4.

In order to limit pivotal movement of link 20 in opposite directions about axis 30 so as to properly orient workpiece holder 22 in its two positions, a first limit switch 88 is mounted on an inclined plate 90 forming part of lower portion 52 of support member 16, and a second limit switch 92 is mounted on the bottom of lower portion 52 of the support member. Leg 26 of link 20 carries a switch actuator member 94 adapted to actuate limit switch 88 when link 20 has pivoted clockwise to the desired extent, and leg 28 of link 20 carries a switch actuator member 96 adapted to actuate limit switch 92 when link 20 has pivoted counterclockwise to the desired extent. It will be appreciated that switches 88 and 92 are interrelated with flow control devices for piston and cylinder assembly 32 so as to achieve the appropriate control of the operation thereof. It will be further appreciated that the limit switches in conjunction with such flow control devices can operate to stop link 20 in the two positions thereof, or reverse fluid flow with respect to the piston and cylinder unit so as to immediately reverse the direction of pivotal movement of link member 20, or provide a combination of these functions. Many fluid flow and switch control arrangements can be provided for this purpose, and a specific arrangement is not necessary in order to understand the principles of operation of the transfer apparatus in accordance with the present invention. Additionally, it will be appreciated that positive stops, not illustrated, can be provided on link 20 and support member 16 which will interengage to limit pivotal movement of link 20 in opposite directions about axis 30. Such a positive stop arrangement can be employed alone or in conjunction with the limit switch arrangement described above.

Figure 6:
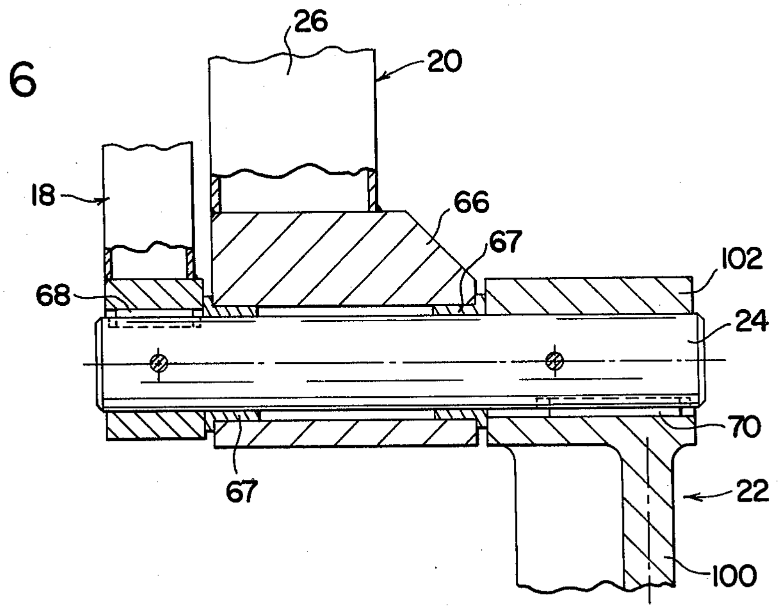
FIG. 6 is a sectional view of a portion of the mechanism taken along line 6—6 in FIG. 4.
Figure 8:
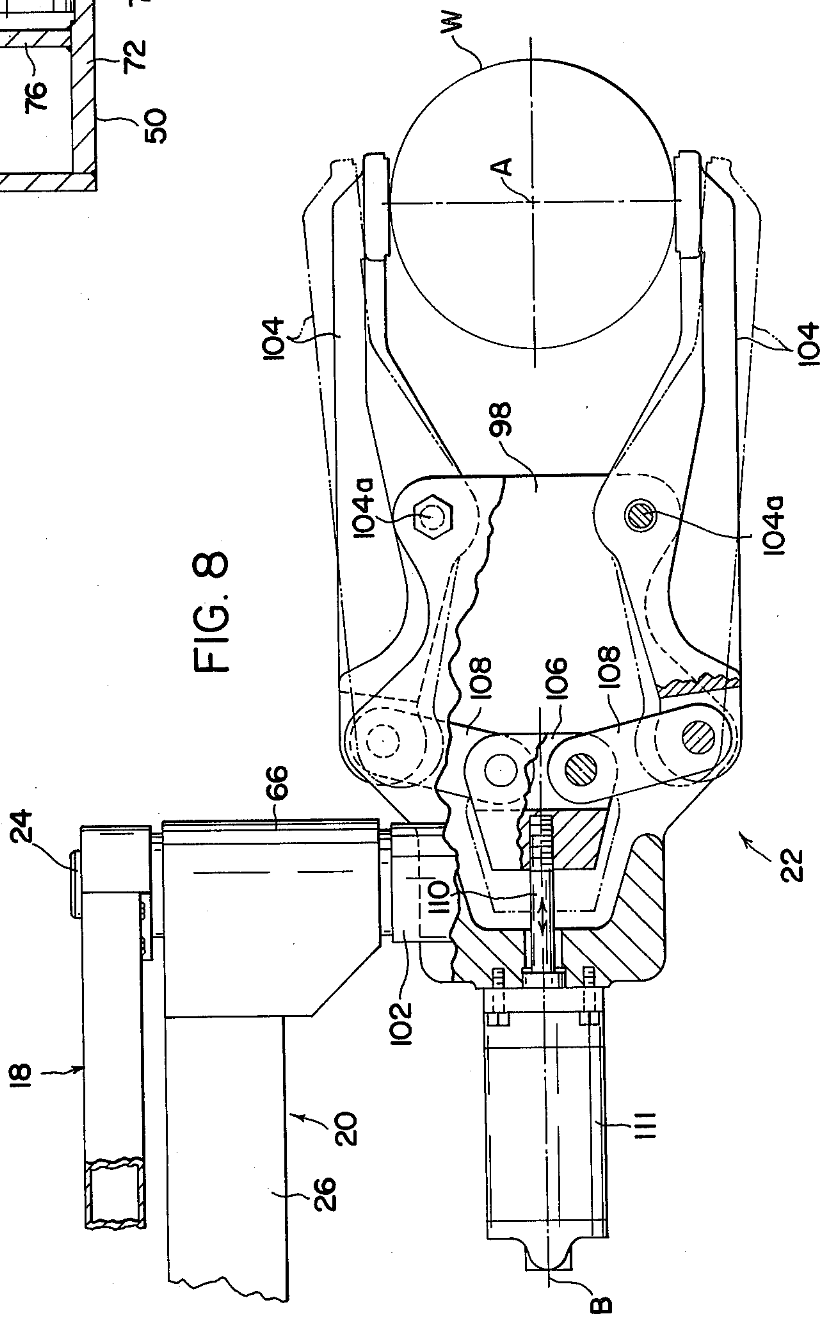

Referring now to FIG. 8 in connection with FIGS. 2–4, workpiece holder 22 includes a body portion 98 interconnected with pin 24 by means of a plate 100 suitably attached to one side of body 98 and having a hub portion 102 apertured to receive pin 24, as shown in FIG. 6. Workpiece gripping and releasing fingers 104 are supported for pivotal movement relative to body portion 98 by corresponding pivot pins **104*a* extending through the fingers intermediate the opposite ends thereof. The inner ends of fingers 104 are each interconnected with an actuator block 106 by means of a corresponding link 108 having opposite ends pivotally interconnected one with the finger and the other with block 106. Actuator block 106 is displaceable relative to body portion 98 and is attached to the piston rod 110 of a pneumatic piston and cylinder type motor 111. Accordingly, actuation of pneumatic motor 110 to displace piston rod 110 to the left in FIG. 8 operates through block 106 and links 108 to pivot fingers 104 about pins 104***a* to spread the fingers, and movement of piston rod 110 to the right causes displacement of fingers 104 toward one another. It will be appreciated, of course, that the cylinder of pneumatic motor 111 is connected to a suitable source of pressurized air and that flow of air thereto to achieve reciprocation of piston rod 110 is controlled such that fingers 104 are actuated between the gripping and releasing positions thereof at each of the two locations of workpiece holder 22 during a transfer operation. Such air flow systems and arrangements therefor to achieve these functions are well within the skill of the art and are not necessary to understand the principles of operation of the transfer mechanism of the present invention. It will be appreciated too that motor 111 could be hydraulically actuated rather than air actuated.

It will be seen from FIG. 2 of the drawing that support member 16 of the transfer mechanism is located adjacent the rear corner post 12*a* on the left hand side of press 12. The lateral relationship between support member 16, transfer arm 18, link 20 and workpiece holder 22 provides for axis B of the workpiece holder to coincide with the centerline of the press in the direction between rear corner post 12*a* and front center post 12*b* on the corresponding side of press 12. Support member 16 can be supported in any suitable manner relative to the press and could, for example, be rigidly fastened to the press frame. Preferably, however, support member 16 is associated with the press for pivotal movement about a vertical axis so that the support member and thus the remaining components of the transfer mechanism can be pivoted clockwise from the position shown in FIG. 3. This advantageously enables the transfer mechanism to be displaced away from the side of the press and rearwardly thereof so as to increase accessibility to the press. Accordingly, as will be seen in FIGS. 2-4, the press rear corner post 12*a* is provided with an upright hinge support 112 on which are mounted a pair of hinge arms 112*a*, and support member 16 is provided with a pair of hinge arms 114 pivotally interconnected with arms 112*a* by corresponding hinge pins 116. In order to properly locate the transfer mechanism relative to the side of press 12 when the mechanism is in the operative position thereof, rear post 12*a* of the press is provided with a stop arm 118 against which lower portion 52 of support member 16 abuts to limit pivotal movement of the mechanism counterclockwise as viewed in FIG. 3. Support member 16 can be releasably maintained in position against stop 118 such as by bolts 120. It will be appreciated that support member 16 of the transfer mechanism on the right hand side of the press in FIG. 1 is hingedly attached to the corresponding front press frame post 12*b* and thus swings forwardly of the press.

In connection with the forging of a hot billet, it becomes desirable to shield the areas surrounding the press from hot sparks or pieces of hot billet material which may be thrown outwardly of the press during the forging operation. In accordance with another aspect of the present invention, such shielding is achieved by screen panels located in a plane between the press frame and the transfer mechanism. More particularly, with reference to FIGS. 2-4 of the drawing, a first screen panel 122 is comprised of screen sections 124, 126 and 128 supported by a corresponding frame assembly extending about the screen sections, and a fourth screen section 130 having a frame assembly hingedly interconnected with the frame assembly for sections 124, 126 and 128 by suitable hinge assemblies 132 and 134. A second screen panel 136 is defined by a screen section 138 and a corresponding frame assembly which is hingedly mounted on support member 16 of the transfer mechanism by corresponding hinge assemblies 140 and 142. The frame assembly for screen panel 122 is hingedly mounted on a support post 144 by means of suitable hinges 146, and support post 144 is bolted or otherwise secured to the press front corner post 12*b*. Accordingly, screen panel 122, defined by sections 124, 126, 128 and 130 as a unit, is adapted to be swung about the axes of hinges 146 and counterclockwise as viewed in FIG. 3 of the drawing, thus to gain access to the corresponding side of the press. Since panel 136 is hingedly mounted on support member 16 of the transfer mechanism, the latter screen panel is movable with the transfer mechanism about the axes of hinge pins 116.

From FIG. 2 of the drawing it will be seen that screen section 130 of panel 122 and screen section 138 are in the path of movement of workpiece holder 22, link 20 and transfer arm 18 of the transfer mechanism. Accordingly, a pneumatic piston and cylinder unit 148 is mounted on the frame assembly of screen panel 122, and the outer end of piston 150 of unit 148 is pivotally connected to a bracket member 152 on the frame of screen section 130 to pivot screen section 130 about the axes of hinges 132 and 134. Therefore, extension of piston rod 150 from the position thereof shown in FIG. 3 operates to pivot screen section 130 clockwise relative to the frame assembly for screen panel 122 and from the solid line to the broken line position shown in FIG. 3. Similarly, a pneumatic piston and cylinder unit 154 is mounted on support member 16 of the transfer mechanism and the outer end of piston rod 156 of unit 154 is pivotally connected to a bracket member 158 actuated to the frame assembly of screen section 138. Accordingly, retraction of piston rod 156 from the position thereof shown in FIG. 3 causes screen panel 136 to pivot counterclockwise about the axes of hinge assemblies 140 and 142 from the solid line to the broken line positions of panel 136 shown in FIG. 3. It will be appreciated, of course, that piston and cylinder units 148 and 154 are connected to suitable sources of pressurized air, not illustrated, and are actuated in coordination with operation of the transfer mechanism to open during movement of workpiece holder 22 across the area normally covered thereby and so as not to interfere with such movement. Accordngly, maximum protection or shielding is achieved during operation of the press and operation of the transfer mechanism in conjunction therewith. At the same time, full access to the corresponding side of the press is readily achievable simply by releasing support member 16 of the transfer mechanism with respect to stop 118, swinging the transfer mechanism about the axes of pins 116, and swinging screen panel 122 about the axes of hinges 146. When the screen panels and transfer mechanism are in the position shown in FIG. 2, any suitable latch mechanism can be employed to maintain screen panel 122 against pivotal movement relative to support post 144. It will be appreciated of course that a similar screen structure is employed in conjunction with the transfer mechanism on the right hand side of the press in FIG. 1.

While considerable emphasis has been placed herein on a specific structure for the transfer mechanism and on the specific structure of certain components thereof, it will be appreciated that many structural arrangements can be devised to achieve article transfer in accordance with the principles of the present invention and that many modifications of the preferred embodiment disclosed herein can be made and will be obvious upon reading the foregoing description. Accordingly, it is to be distinctly understood that the foregoing description is to be interpreted merely as illustrative of the present invention and not as a limitation.

What is claimed is:

1. A mechanism for transferring a workpiece between first and second spaced apart locations comprising, support means between said locations, arm means, means slidably and pivotally interengaging said arm means and said support means, a workpiece holder connected to said arm means for movement therewith and against movement relative thereto, said workpiece holder and a workpiece held thereby having axes of orientation, and means to slidably and pivotally displace said arm means relative to said support means to transfer said workpiece holder and said workpiece held thereby between said first and second locations, said sliding and pivotal displacement of said arm means rotating said axes of orientation during said transfer to change the orientation of said axes between said first and second locations.

2. The transfer mechanism according to claim 1, wherein said means to displace said arm means includes link means pivotally interconnected with said support means and with said arm means.

3. The transfer mechanism according to claim 2, wherein said means to displace said arm means further includes means to pivot said link means relative to said support means.

4. The transfer mechanism according to claim 1, wherein said workpiece holder includes gripping means displacable between workpiece gripping and releasing positions, and means to displace said gripping means between said gripping and releasing positions.

5. The transfer mechanism according to claim 1, wherein said means interengaging said support means and arm means is track means and follower means, said track means being on one of said support means and arm means, and said follower means being on the other of said support means and arm means.

6. The transfer mechanism according to claim 5, wherein said means to displace said arm means includes link means pivotally connected to said arm means at a first axis and to said support means at a second axis, said first and second axes and the axis of said follower means defining the corners of a triangle when said workpiece holder is in said first and second locations, and means to pivot said link means in opposite directions about said second axis.

7. The transfer mechanism according to claim 6, wherein said support means is a beam having opposite ends and said arm means is an arm member, said track means being on said beam adjacent one of said ends, and said follower means being on said arm member, said second axis being adjacent the other of said opposite ends of said beam, and said workpiece holder being connected to said arm member adjacent said first axis.

8. The transfer mechanism according to claim 7, wherein said workpiece holder includes gripping means displaceable between workpiece gripping and releasing positions, and means to displace said gripping means between said gripping and releasing positions.

9. A mechanism for transferring a workpiece between first and second horizontally spaced apart locations comprising, an upright support member between said locations and having upper and lower ends, said support member having a vertically extending guide track at said upper end, an arm having first and second ends, follower means on said first end engaging said guide track to slidably and pivotally interengage said arm and support member, a link member having first and second ends, said first end of said link member being pivotally interconnected with said support member at a first axis adjacent said lower end thereof, means pivotally interconnecting said second ends of said arm and link member, whereby pivotal movement of said link member in opposite directions about said first axis slidably and pivotally displaces said arm relative to said support member to transfer said second end of said arm in the direction between said first and second locations, means to pivot said link member about said first axis, and workpiece holder means interconnected with said second end of said arm for movement therewith in said direction and against movement relative to said arm, said workpiece holder and a workpiece held thereby having axes of orientation, and said sliding and pivotal displacement of said arm rotating said axes of orientation 90° during transfer of said workpiece holder between said first and second locations.

10. The transfer mechanism according to claim 9, wherein said guide track is a recess in said support member and said follower is a circular member on said arm and received in said recess.

11. The transfer mechanism according to claim 9, wherein said means pivotally interconnecting said second ends of said arm and link member includes a pin, said pin being fixed against rotation relative to said arm, and said workpiece holder being mounted on said pin and fixed against rotation relative thereto.

12. The transfer mechanism according to claim 11, wherein said workpiece holder includes fingers pivotal between workpiece gripping and releasing positions, and means to actuate said fingers between said positions thereof.

13. The transfer mechanism according to claim 12, wherein said means to pivot said link member includes fluid actuated piston and cylinder means connected between said support member and link member.

14. The transfer mechanism according to claim 13, and means supporting said support member for pivotal movement about a vertical axis.

15. The transfer mechanism according to claim 13, wherein said guide track is a recess in said support member and said follower is a circular member on said arm and received in said recess.

* * * * *